LOGICAL CIRCUIT USING MAGNETIC CORES

Filed Aug. 1, 1961

United States Patent Office 3,303,351

Patented Feb. 7, 1967

3,303,351

LOGICAL CIRCUIT USING MAGNETIC CORES

Shintaro Oshima, Musashino-shi, Tokyo-to, Hajime Enomoto, Sugano-machi, Ichikawa-shi, Chiba-ken, Seiichi Inoue, Musashino-shi, Tokyo-to, and Yasuo Koseki, Chofu-shi, Tokyo-to, Japan, assignors to Kokusai Denshin Denwa Kabushiki Kaisha, Tokyo-to, Japan, a joint-stock company of Japan Filed Aug. 1, 1961, Ser. No. 128,530

Claims priority, application Japan, Aug. 3, 1960, 35/33,460, 35/33,462, 35/33,464

4 Claims. (Cl. 307—88)

This invention relates to a logical element and more particularly to a logical element including an even number of magnetic cores and provided with a plurality of input windings divided for each of the cores or for a respective pair of cores and thus capable of producing an output pulse signal which has an odd number of possible states.

The nature, principle, object, structure, and details of the invention will be apparent from a consideration of the following description, taken in conjunction with the accompanying drawings in which the same and equivalent parts are designated by the same reference letters or numerals, and in which.

Figure 1:
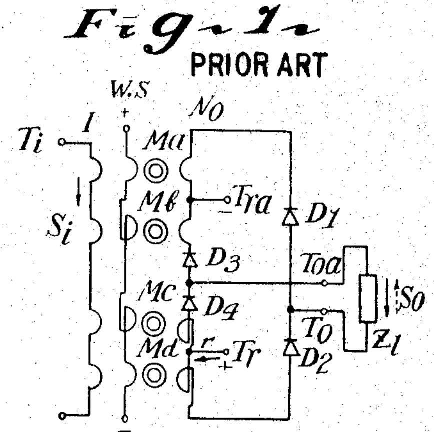
Fig. 1 PRIOR ART
FIG. 1 is a connection diagram indicating one example of a conventional logical element prior to this invention.

The inventors of the present invention have previously proposed a logical element in the United States patent application Serial No. 859,612, filed on December 15th, 1959, and now abandoned, wherein, for example, as indicated in FIG. 1, magnetic cores M*a*, M*b*, M*c* and M*d* (the number thereof is four in the case shown in FIG. 1) are employed as a set of cores. The magnetic cores are provided with an input signal winding I, a winding WS for writing-in and resetting and an output winding N*o*; coils of the output windings and rectifying elements $D_1$, $D_2$, $D_3$ and $D_4$ are combined as indicated in the drawing. Terminals T*r* and T*ra* are provided for supplying reading-out pulse and output terminals T*o* and T*oa* are provided at the opposite corners of a bridge circuit.

Figure 2:
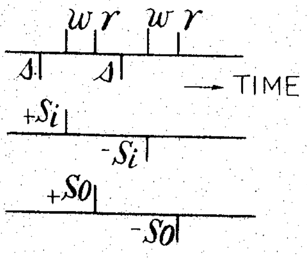
FIG. 2 is a diagrammatical representation of the pulse train for driving logical elements, such as shown in FIG. 1 and according to this invention.

The logical operation of this logical element is as follows. In the arrangement of FIG. 1, by causing a signal current S*i* of positive or negative polarity to flow through a signal input terminal T*i* and causing a writing-in current *w* of positive polarity and resetting current *s* of negative polarity to flow through the WS winding in such a manner that the current *w* and the input signal S*i* are caused to flow simultaneously as indicated in FIG. 2, the writing-in of the information into each magnetic cores, each of which has substantially a rectangular hysteresis characteristic, is accomplished in the states of the directions of the residual magnetism. Then, when this information which has been written-in is to be read out, a driving pulse *r* for reading out is caused to flow in the direction from the terminal T*r* to the terminal T*ra* as indicated in FIG. 2, and the information is read out in the state of polarity of the pulse current with a load Z which is connected to the output terminals T*o* and T*oa*.

It is apparent that if it were possible, in the case wherein such apparatuses as electronic computing machines and communication apparatuses are constructed by the use of such a logical element as described above, to provide a logical element capable of transmitting the output currents of such an element directly into a memory apparatus, such an element would be of great usefulness.

In the element proposed in United States patent application Serial No. 859,612, now abandoned, the fact that its output has a constant pulse wave form is highly suitable for writing-in digital information into a memory apparatus. However, its output state can provide only two possible states, such as two kinds of output currents of positive or negative polarity. This is an unsuitable condition for writing-in of digital information into a memory apparatus, and it is required as a desirable condition that the writing-in of information signal into a memory apparatus assumes three possible states including a zero state wherein the output current is zero.

It is therefore one object of the present invention to provide a new logical element which is to be adapted to obtain an output having an odd number of possible states in order to satisfy the above-mentioned requirement, and which thereby has a function suitable for directly transferring binary information into a memory apparatus.

The above-mentioned object and other objects of this invention have been attained by a logical element including an even number of magnetic cores, input means for applying input pulse currents to the cores, WS means for applying a resetting pulse current and a writing-bias current, and an output bridge current.

The magnetic cores each have a substantially rectangular hysteresis characteristic. The WS means may be composed of one common winding wound on the cores, or may be two windings one of which is used for applying a writing-bias pulse current and the other of which is used for applying a resetting pulse current. The output bridge circuit is formed so that a series-connection of a coil wound on one of the cores and a rectifying element constitutes each of at least two adjacent arms, a reading-out terminal means for applying a reading-out pulse current to the cores being provided at one pair of opposite corners of the bridge circuit. This element is characterized in that the input means comprises a plurality of individual input windings, each of which is composed of at least one coil wound on one of the cores for receiving a respective one of the input signals, whereby an output pulse current having an odd number of possible states are obtained by the application of the read-out pulse current.

The principle and details of the present invention will now be described with reference to the drawings.

Figures 3, 4:
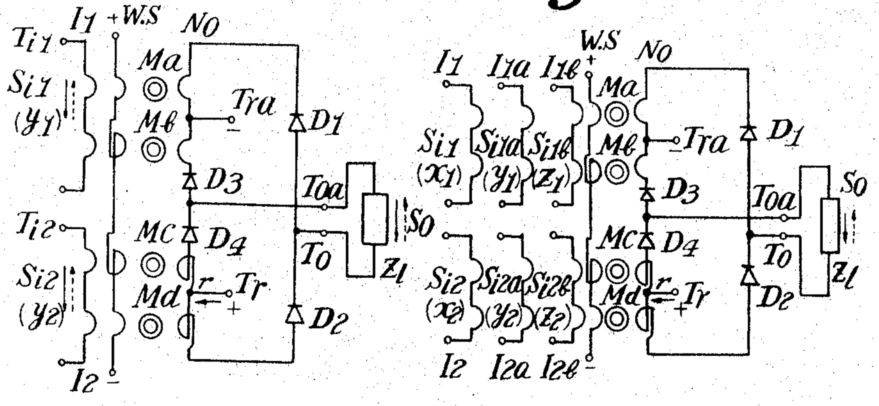
FIG. 3 is a connection diagram showing one embodiment of the logical element of the present invention.
FIGS. 4, 5, 6 and 7 are connection diagrams showing other embodiments of the present invention.

In the embodiment of the logical element according to the invention shown in FIG. 3, the signal input winding I which is the same as that of the circuit shown in FIG. 1 is divided into two parts to form a set of input windings. One part is so wound that its winding directions are the same as those of the output coils with respect to the magnetic cores M*a* and M*b* and adapted to be an input winding $I_1$; and a signal pulse current $Si_1$ is caused to flow by way of an input terminal $Ti_1$. The other part of winding I is so wound that its winding directions are opposite to those of output coils with respect to the magnetic cores M*c* and M*d* and adapted to be an input winding $I_2$, and a signal pulse current $Si_2$ is caused to flow by way of an input terminal $Ti_2$.

When, as indicated in FIG. 3, the state wherein the input signals imparted to the terminals $Ti_1$ and $Ti_2$ flow in the direction of the arrows shown by solid lines is denoted by the state "1", the state wherein the signals flow in the direction of the arrows shown by dotted lines is denoted by the state "0". Moreover, the logical variable representing the state of the input signal current $Si_1$ applied to the terminal $Ti_1$, is denoted by $Y_1$, and the logical variable representing the state of the input signal current $Si_2$ applied to the terminal $Ti_2$ is denoted by $Y_2$; and when the following relation is valid, $$Y_1=Y_2=x \text{ (where } x \text{ equals "1" or "0")}$$

that is when input signals of the same polarity are applied to the terminals $Ti_1$ and $Ti_2$, the operation of this element is exactly the same as that of the logical element indicated in FIG. 1. More specifically, first, by causing a sufficiently large driving pulse current $s$ to flow from the terminal (−) towards the terminal (+) of the WS winding, that is, to flow in the negative polarity as indicated in FIG. 2, the polarity of the residual magnetism of the magnetic cores M*a*, M*b*, M*c* and M*d* are placed in the reset states, respectively, (−), (+), (+) and (−). Next, a writing-in driving pulse $w$ which is substantially the same intensity as the coercive force Hc of the magnetic core is applied to the WS winding in the direction from the terminal (+) to the terminal (−), and, simultaneously, input signal pulses $Si_1$ and $Si_2$ are caused to flow through the input signal windings $I_1$ and $I_2$. In this case, when the pulses $Si_1$ and $Si_2$ are of positive polarity, writing-in thereof into the magnetic cores M*a*, M*b*, M*c* and M*d* will be accomplished, respectively, in the states ((+), (+), (+) and (+)) of the residual magnetism of the magnetic cores. On the contrary, the pulses $Si_1$ and $Si_2$ are of negative polarity, writing-in thereof into the cores, will be acomplished, respectively, in the states ((−), (−), (−) and (−)) of the residual magnetism of the magnetic cores.

Then, when this information written-in into the magnetic cores is to be read out, a reading-out driving pulse current $r$ is caused to flow in the direction from terminal T*r* to terminal T*ra*. Then, when the magnetic cores are, respectively, established in the states (+), (+), (+) and (+), the output coils on the cores M*d* and M*b* will present a high impedance and the output coils of the cores M*a* and M*c* will present a low impedance, with respect to the reading-out driving pulse current $r$. Accordingly, the current $r$ will flow mainly as follows: the output coil on the core M*c*—the diode $D_4$—the load $Z_1$—the diode $D_1$—the output coil on the core M*a*, and it will transfer the larger part of the reading-out driving pulse current, as an output pulse current of direct positive polarity (in the direction of the solid-line arrow), to the load Z*l*. Then, in this case, the states of magnetic cores M*b* and M*d* are caused to change from the state (+) to the state (−) by a small current which is a portion of the current $r$ flowing in the direction of the output coil of high impedance, and the magnetic cores assume respectively, the states (+), (−), (+) and (−).

On the other hand, when the magnetic cores are in the states (−), (−), (−) and (−), the high or low states of the impedances of coils on the cores will be respectively reversed opposite to the states mentioned above, and the current $r$ will flow mainly as follows: the output coil on the core M*d*—the diode $D_2$—the load Z*l*—the diode $D_3$—the output coil on the core M*b*, and the information is transferred, as an output pulse current of negative polarity (in the direction of the dotted-line arrow), to the load Z*l*, and at the same time, the magnetic cores are established in the states (+), (−), (+) and (−).

In this case, it is not necessary that an element of the same kind is employed as the load, but any circuit element which has a suitable impedance (or example, a head coil of a magnetic drum memory and a driving conductor of a core memory), can be employed as the load. After the information has been read out, by causing the resetting pulse $s$ to flow through the WS winding in the negative direction, the magnetic cores are returned to their respective reset states (−), (+), (+) and (−). These writing-in and reading-out operations are repeated successively.

Next, the case wherein logical variables $y_1$ and $y_2$ which represent the states of the input signals $Si_1$ and $Si_2$, are given, respectively, by $x$ and $\overline{x}$ (where $\overline{x}$ expresses "NOT" of $x$), that is, the case wherein the input signal currents $Si_1$ and $Si_2$ are pulse currents, which have been mutually opposite directions, will now be considered. First, the polarities of the residual magnetism of the cores are placed, by means of a resetting pulse $s$, in their reset states (−), (+), (+) and (−). Then, a writing-in driving pulse current $w$ is caused to flow in the direction from (+) to (−) into the WS windings. Simultaneously, pulse currents $Si_1$ and $Si_2$ which have mutually opposite directions as described-above flow, respectively, through the input signal windings $I_1$ and $I_2$. Accordingly, when the current $Si_1$ is of positive polarity and the current $Si_2$ is of negative polarity, the magnetic cores M*a*, M*b*, M*c* and M*d* are, respectively, established in the states (+), (+), (−) and (−). On the other hand, when the current $Si_2$ is of positive polarity and the current $Si_1$ is of negative polarity, the magnetic cores M*a*, M*b*, M*c* and M*d* are, respectively, established in the states (−), (−), (+) and (+).

Then, by causing a reading-out driving pulse current $r$ to flow in the direction from the terminal T*r* to the terminal T*ra*, the windings on the cores M*a* and M*d* will present a low impedance, and the winding on the cores M*b* and M*c* will present a high impedance with respect to the reading-out driving pulse current $r$ if the magnetic cores are established in the states (+), (+), (−) and (−). Accordingly, the greater part of the current $r$ will flow through the following path: the output coil on the core M*d*—the diode $D_2$—the diode $D_1$—the output coil on the core M*a*, and the remaining part will flow through the following path: the output coil on the core M*c*—the diode $D_4$—the diode $D_3$—the output coil on the core M*b*.

If the magnetic cores are established in the states (−), (−), (+) and (+), the greater part of the current $r$ will, conversely, flow through the following path: the output coil on the core M*c*—the diode $D_4$—the diode $D_3$—the output coil of the core M*b*, and the remaining part will flow through the following path: the output coil on the core M*d*—the diode $D_2$—the diode $D_1$—the output coil on the core M*a*.

If the number of turns of the output coils on the respective magnetic cores are equal for all cores and the rectification characteristic of the four rectifying elements are substantially equal to one another, the impedance of the path, the terminal T*r*—the output coil on the core M*d*—the diode $D_2$—the terminal T*o*, will be almost equal to the impedance of the path, the terminal T*o*—the diode $D_1$—the output coil on the core M*a*—the terminal T*ra*, with respect to the reading out current $r$. Furthermore, the impedance of the path, the terminal T*r*—the output coil on the core M*c*—the diode $D_4$—the terminal T*oa*, is almost equal to the impedance of the path, the terminal T*oa*—the diode $D_3$—the output coil of the core M*b*—the terminal T*ra*, whereby the output bridge circuit is substantially in the state of equilibrium. Therefore, almost no current flows through the load. Accordingly, when $y_1$ equals $x$ and $y_2$ equals $\overline{x}$, the input signal is not transferred to the load, and it is possible to assume this condition to correspond to the state "0." Moreover, it is also possible to express, as the state "1" the state wherein $y_1=y_2=1$, that is, the state wherein a pulse current of positive polarity flows through the load, and to express, as the state "−1," the state wherein $y_1=y_2=0$, that is, the state wherein a pulse current of negative polarity flows through the load. In other words, by the combination of two input signals $y_1$ and $y_2$, a three-valued output current and a characteristic feature suitable, particularly, for memorizing binary information into a memory apparatus is obtainable.

In the case wherein a memory element (for example, a head coil of a magnetic drum memory) is connected as the load of the element of the present invention, the two-valued logical variable to be memorized into the memory apparatus is denoted by "$x$", and the control signal for the purpose of transferring the variable "$x$" to the memory apparatus is denoted by "$z$" (it being here assumed that when $z=1$, the variable "$x$" is transferred to the memory apparatus, and when $z=0$, the variable "$x$" is not transferred thereto), if a logical circuit in which either of $y_1$ and $y_2$ becomes the product $xz$ and the other becomes the sum $(x+z)$ is provided in the preceding stage of the present element, it will be possible to transfer, as a pulse current of positive or negative polarity, an input signal of the information $x$ into the memory apparatus.

In a logical element of this invention, it is possible by further increasing the number of the set of input windings and imparting an independent signal to each winding to carry out logical operations of various kinds. One example of such an embodiment of the invention, in which two additional sets of input windings are added to that of the arrangement of FIG. 3 to make a total of three sets, is illustrated in FIG. 4. In this embodiment three input windings $I_1$, $I_{1a}$ and $I_{1b}$ are wound on the magnetic cores M$a$ and M$b$, and three input windings $I_2$, $I_{2a}$ and $I_{2b}$ are wound on the cores M$c$ and M$d$, all being wound in the same direction.

The states of the input signal to be applied to the windings $I_1$, $I_{1a}$, $I_{1b}$, $I_2$, $I_{2a}$, and $I_{2b}$ will be represented, respectively, by two-valued logical variables, $x_1$, $y_1$, $z_1$, $x_2$, $y_2$, and $z_2$. The results of decision by majority among three inputs $x_1$, $y_1$ and $z_1$ are established to the magnetic cores M$a$ and M$b$, and the results of decision by majority among the three inupts $x_2$, $y_2$, and $z_2$ are established in the magnetic cores M$c$ and M$d$. When this element is to be used as a circuit for writing-in binary information into a memory apparatus, the logical variables $x_1$ and $x_2$, for example, are used to correspond to the binary information $x$ which is to be memorized into the memory apparatus. The logical variable $y_1$ is caused to correspond to a control signal $v$ adopted to transfer the information into the memory apparatus, and the logical variable $y_2$ to the "NOT" thereof, $v$; and states "0" and "1" are given, respectively, for the logical variable $z_1$ and $z_2$. If the control signal $v$ is in the state 1, the currents $Si_{1a}$ and $Si_{1b}$ will flow in the directions opposite to each other. Therefore, the magnetic fields induced in the magnetic cores by the currents $Si_{1a}$ and $Si_{1b}$ will cancel each other. With respect to the currents $Si_{2a}$ and $Si_{2b}$, the same operation is carried out. Accordingly, writing-in of the information into the magnetic cores will be carried out by only the information signal $x$, and the information will be transferred to the load, for example, a memory apparatus. Conversely, if the control signal $v$ is in the state "0," the magnetic field created in the magnetic cores by the set of current $Si_{1a}$, $Si_{2a}$ and the set of current $Si_{1b}$ and $Si_{2b}$ will be cumulatively added, and the magnetic cores will be established, irrespective of the state of the information signal $x$, in the states (−), (−), (+) and (+). Consequently, when a reading-out driving pulse current $r$ is applied thereto, the output current is maintained in a state of equilibrium, and the information is not transferred to the load.

Furthermore, each of the logical elements as shown in FIGS. 3 and 4, which provide a three-valued output, are capable of accomplishing complex logical operations by connecting, to the succeeding stage thereof, a binary logical element such as proposed hitherto. For instance, the output of the element of FIG. 4 is connected to two of the input windings of a logical element, which has three input windings proposed heretofore and which is composed of four magnetic cores, in such a manner that the polarities of the said two windings are in the same direction, and an input signal of positive or negative polarity is caused to be imparted continuously as a constant input to the other input winding. Then, if the logical variable indicating the polarity of the constant input is denoted by "C," the logical variable indicating the output state of the logical element in FIG. 4 is denoted by "$C_1$" (having three possible states), the logical variable indicating the output state of the element of the succeeding stage is denoted by "$C_2$" (having two possible states) and the relationships among these three variables C, $C_1$ and $C_2$ are determined as indicated in Table 1, and it will be possible to convert the variable $C_1$ which has three possible states into a binary information $C_2$.

TABLE 1

| | | | | | | |
|---|---|---|---|---|---|---|
| $C_1$ | −1 | 0 | 1 | −1 | 0 | 1 |
| C | 0 | 0 | 0 | 1 | 1 | 1 |
| $C_2$ | 0 | 0 | 1 | 0 | 1 | 1 |

Now, in the case wherein signals $x_1$, $x_2$, $y_1$ and $y_2$ among the six inputs of the circuit shown in FIG. 4, for example, are caused to be variable and a constant signal "1" is applied to the remaining two inputs $z_1$ and $z_2$, if "C" is caused to be equal to "0," the output $0_2$ of the element of the succeeding stage can be expressed by the following logical equation.

$$0_2=(x_1+y_1)\ (x_2+y_2)$$

In the case: $z_1=z_2=0$ and $C=0$, the expression for "$C_2$" is as follows:

$$C_2=x_1 \cdot y_1 \cdot x_2 \cdot y_2$$

Furthermore, in the case: $z_1=z_2=1$, and $C=1$ the expression for "$C_2$" is as follows:

$$C_2=x_1+y_1+x_2+y_2$$

Figure 5:
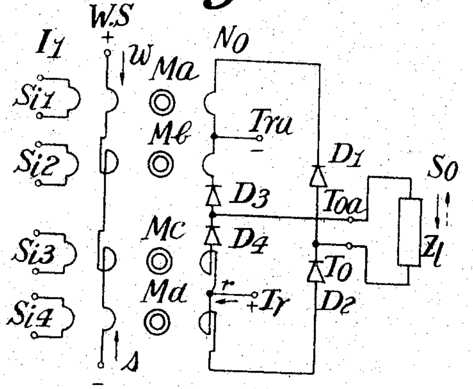

On the other hand, if the input winding of the element as shown in FIG. 3 is further divided so that the divided input winding is wound on only one magnetic core, such an element having four input windings as shown in FIG. 5 will be obtained. Accordingly, in the element of FIG. 5, when input signals $Si_1$, $Si_2$, $Si_3$ and $Si_4$ which are independent from one another are imparted to the input winding $I_1$, the input signals are independently written-in into the magnetic cores, whereby the output pulse current which is made to flow through the load by application of a reading-out pulse current will be obtained in the five states "2," "1," "0," "−1" and "−2" in accordance with the combination of the input signals. These relations are shown in Table 2.

TABLE 2

| Input signal | | | | Output signal |
|---|---|---|---|---|
| $Si_1$ | $Si_2$ | $Si_3$ | $Si_4$ | So |
| − | − | − | − | −2 |
| − | − | − | + | −1 |
| − | − | + | − | −1 |
| − | + | − | − | −1 |
| + | − | − | − | −1 |
| − | − | + | + | 0 |
| − | + | − | + | 0 |
| + | − | − | + | 0 |
| − | + | + | − | 0 |
| + | − | + | − | 0 |
| + | + | − | − | 0 |
| − | + | + | + | +1 |
| + | − | + | + | +1 |
| + | + | − | + | +1 |
| + | + | + | − | +1 |
| + | + | + | + | +2 |

Figures 6, 7:
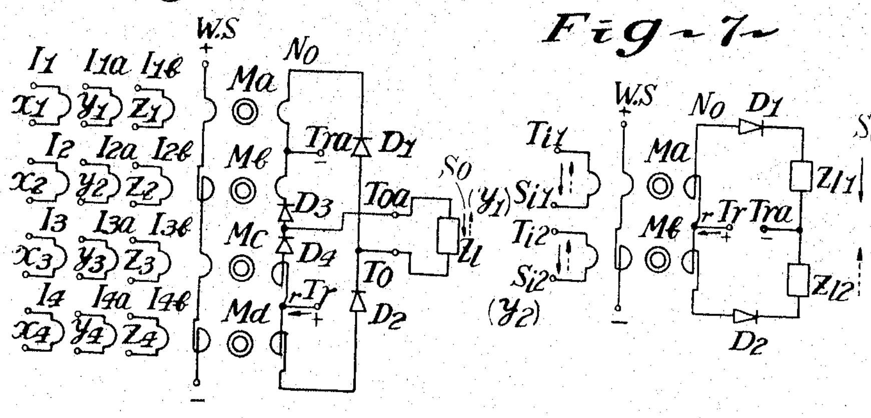

Furthermore, if the input winding in the element of FIG. 4 is further divided and each of the divided input windings is wound on only one magnetic core, an element having twelve input windings will be obtained. An embodiment, wherein different input signals are, respectively, applied to the divided input windings, is shown in FIG. 6. When it is assumed that input signals represented, respectively, by the logical variables $x_1$, $y_1$, $z_1$, $x_2$, $y_2$, $z_2$, $x_3$, $y_3$, $z_3$, $x_4$, $y_4$, and $z_4$ are applied respectively, to the twelve input windings $I_1$, $I_{1a}$, $I_2$, $I_{2a}$, $I_{2b}$, $I_3$, $I_{3a}$, $I_{3b}$, $I_4$, $I_{4a}$ and $I_{4b}$, the results of decision by majority among four sets of three input signals ($x_1$, $y_1$, $z_1$), ($x_2$, $y_2$, $z_2$), ($x_3$, $y_3$, $z_3$) and ($x_4$, $y_4$, $z_4$) are written into the magnetic cores, thus enabling a complex logical operation. In this case, a five-valued output current can be obtained similarly as in the case of the embodiment of FIG. 6.

Furthermore, when the output of the element of FIG. 6 is applied, in the same polarity and direction to two of three input windings of the logical operation circuit element, the instant logical element is equivalent to an element wherein two input windings similar to the input winding I of logical element shown in FIG. 1 are further provided with logical element, shown in FIG. 1, and a constant input "C" is applied to the other remaining input windings, the output "$C_1$" of the logical circuit including two elements becomes as follows, if the magnitude of the constant current is selected to be approximately 3/2 times that of normal input signal. In the case ($z_1$=$z_2$=3=$z_4$=0, C=0):

$$C_1=x_1+x_2+x_3+x_4+y_1+y_2+y_3+y_4$$

and in the case ($z_1$=$z_2$=$z_3$=$z_4$=1, C=1):

$$C_1=x_1x_2x_3x_4y_1y_2y_3y_4$$

whereby the logical sum and logical product of eight inputs can be obtained.

The above-mentioned embodiments relate to the cases wherein four magnetic cores are used, but this invention can be applied to the logical element for obtaining a similar three-valued logical output by the use of two magnetic cores.

Such an embodiment is shown in FIG. 7, wherein two kinds of loads $Zl_1$ and $Zl_2$ having the same impedance are connected to the output side. The connection point thereof is a terminal T*ra*. When the output current of this element is to be brought to the state (+1) or (−1), the signals to be applied to the input windings $Ti_1$ and $Ti_2$ are made to be of the same polarity in the same manner as in the case of four magnetic cores. In this case, the polarities of the residual magnetism in the magnetic cores M*a* and M*b* assume respectively, the states (+), (+) or (−), (−), in accordance with the positive or negative polarity of the input signal, by the writing-in, driving pulse. Then when a driving pulse *r* for reading out is applied across the terminals T*r* and T*ra*, the output coils of the magnetic cores M*a* and M*b* present, respectively, a low impedance and a high impedance in the case of positive polarity of the input signal (in the direction of the solid arrow line), and present, respectively, a high impedance and a low impedance in the case of negative polarity of the input signal, whereby almost all parts of the pulse current *r* pass through the load $Zl_1$ in the direction of solid arrow line in FIG. 7 in the former case and pass through the load $Zl_2$ in the direction of the broken line arrow in the latter case. For example, if it is assumed that the loads $Zl_1$ and $Zl_2$ are head coils of a magnetic drum, and the terminal T*ra* is a center point of the windings, it will be possible to write in any information signal into the magnetic drum. In the case wherein the polarities of the input signals applied to the terminals $Ti_1$ and $Ti_2$ are reverse to each other, the polarities of the residual magnetisms of the magnetic cores M*a* and M*b* are caused to assume respectively, the states (+), (−) or (−), (+) by applying the currents $Si_1$, $Si_2$ and W. In this case, when reading-out is to be carried out by the current R, the output circuit assumes an equilibrium condition, and the kinds of pulse currents, the magnitudes of which are equal and the directions of which are reverse to each other, are made, respectively, to flow through the impedances $Zl_1$ and $Zl_2$, thus cancelling the influences imparted to the loads. For example, as described above, when the load is a head coil of a magnetic drum, the magnetic fields produced by the current flowing through the loads $Zl_1$ and $Zl_2$ are mutually cancelled, and no information is imparted to the load.

An example wherein digital information is written-in into a magnetic drum memory apparatus will be described as follows.

In the case of writing-in information according to the return to zero method it is necessary to substantially erase the prior information memorized when new information is to be written-in, because the prior information memorized has been generally established in the magnetic drum memory apparatus. It is assumed that a current of positive polarity and another current of negative polarity are imparted to the exciting winding so as to correspond, respectively, to binary digits "1" and "0." In this case, any difficulty would not occur when a binary digit "1" or "0" is written-in into the magnetic drum memory apparatus having digital information of a binary digit "0" and when a binary digit "1" is written in the magnetic drum memory apparatus having digital information of a binary digit "1." However, for the purpose of writing in a binary digit "0" into the magnetic drum memory apparatus having a digital information of "1," said information of "1" must be completely erased. If this erasure is incomplete the remaining component of the information memorized becomes a noise signal when the read-out current is applied thus causing erroneous read-out of the information.

Figure 8:
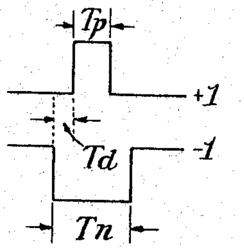
FIG. 8 is a diagram illustrating the relation between durations of pulses to be employed for driving the logical element of this invention.

In order to eliminate the aforesaid disadvantage, when a binary digit "0" is to be written-in, that is, when a pulse of negative polarity is to be generated at the output side of the logical element of this invention, this pulse current must have a duration capable of sufficiently covering the duration of the pulse current of positive polarity. This condition can be easily realized by controlling the duration and rise time of the read-out pulse current *r* in accordance with the information "1" or "0" to be written-in. Relation between the duration of the positive and negative output pulse currents to be written-in into the magnetic drum memory apparatus is shown in FIG. 8.

Figure 9:
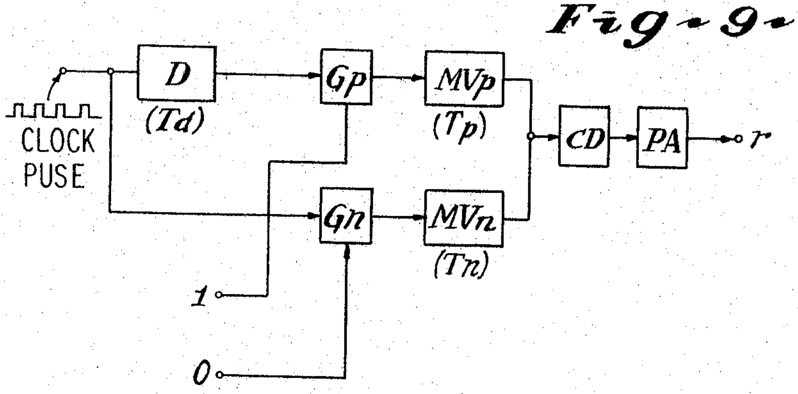
FIG. 9 is a block diagram of means for producing the driving pulse shown in FIG. 8.

FIG. 9 shows a block diagram of a control circuit, in which the reading-out pulse current *r* which is applied to the logical element of this invention is produced in synchronization with a clock pulse, but the pulse duration of the current *r* is controlled by gating gate currents of a gate circuit G*p* for a positive pulse and another gate circuit G*n* for a negative pulse which are controlled by the binary digit "1" or "0" of the information written-in into the magnetic drum memory apparatus. A delay circuit D which imparts a necessary delay time T*d* such as shown in FIG. 8 is provided at the position prior to the gate circuit G*p*. A multi-vibrator circuit MV*p* for positive pulses and another multi-vibrator circuit MV*n* for negative pulses determine, respectively, the duration T*p* of a positive pulse and duration T*n* of a negative pulse. The outputs of the circuits MV*p* and MV*n* are combined through a coupling circuit CD and a desired reading-out pulse current *r* is produced with the circuit of a power amplifier PA. The pulse current *r* produced is applied from the terminal T*r* to the terminal T*ra* of the logical element of this invention. As mentioned above in detail the logical element according to this invention can be employed as effective means for writing-in information into a magnetic drum memory apparatus or into a magnetic core memory apparatus for selecting line signals and for carrying out complex logical operation in a small number of elements. Accordingly, the present invention has important industrial application.

We claim:

1. A logical element comprising, four magnetic cores each having a substantially rectangular hysteresis characteristic, exciting means comprising at least one winding having four series-connected exciting coils wound on said cores for applying thereto a resetting pulse current and a writing-bias current in opposite directions with respect to each of the cores, input means comprising four separate windings each having one coil wound separately on a respective one of said four cores for applying respectively independently four input signals to said cores, an output bridge circuit comprising four arms each of which is composed of an output coil wound on respective ones of the cores and a rectifying element which is connected in series therewith, reading-out terminal means provided at one pair of opposite corners of said bridge circuit for applying a reading-out pulse current to said cores, the exciting coils and the output coils coupling the cores paired in groups and coupling one of the cores of a pair in one sense and the other core of a pair in another in an opposite sense, whereby a pulse current having an odd number of possible states is derived as an output from said reading-out terminal means at opposite corners of said output bridge circuit other than the first mentioned opposite corners.

2. A logical element according to claim 1, comprising an odd number of said input means identical to one another for majority decision operation with respect to input signals applied.

3. A logical element, comprising four magnetic cores each having a substantially rectangular hysteresis characteristic, exciting means comprising at least one winding which is composed of four series-connected exciting coils wound on respective cores for applying a resetting pulse current and a writing-bias current thereto in opposite directions with respect to each of the cores, input means comprising two windings each of which is composed of two series-connected coils wound on two respective groups of said four cores and divided into two parts for applying respectively two input signals to said groups of said cores, an output bridge circuit comprising four arms each of which comprises an output coil wound on a respective one of said cores and a rectifying element in series therewith, reading-out terminal means provided at one pair of opposite corners of the bridge circuit for applying a reading-out pulse current to the cores, and output terminal means provided at the other pair of opposite corners of the bridge circuit, the exciting coils and the output coils coupling, in each of the groups of the cores, one of the cores in the same sense and the other of the cores in the opposite sense, whereby a pulse current having an odd number of possible states is derived as an output from the output terminal means.

4. A logical element according to claim 3, including an odd number of said input means identical to one another for majority decision operation with respect to the input signals applied.

References Cited by the Examiner

UNITED STATES PATENTS

| | | | |
|---|---|---|---|
| 2,909,673 | 10/1959 | Gunderson | 307—88 |
| 2,935,737 | 5/1960 | Muroga | 307—88 X |
| 2,935,738 | 5/1960 | Richards | 307—99 X |
| 3,008,054 | 11/1961 | Saltz | 307—88 |
| 3,098,157 | 7/1963 | Enomoto | 307—88 |

BERNARD KONICK, *Primary Examiner.*

IRVING L. SRAGOW, R. R. HUBBARD, M. S. GITTES, *Assistant Examiners.*